United States Patent [19]

Gotoh

[11] Patent Number: 4,554,476

[45] Date of Patent: Nov. 19, 1985

[54] BRUSH-RETAINING DEVICE

[75] Inventor: Hitoshi Gotoh, Himeji, Japan

[73] Assignee: Mitsubishi Denki Kabushiki Kaisha, Tokyo, Japan

[21] Appl. No.: 642,210

[22] Filed: Aug. 20, 1984

[30] Foreign Application Priority Data

Sep. 6, 1983 [JP] Japan ........................... 58-139367[U]

[51] Int. Cl.⁴ ............................................. H02K 13/00

[52] U.S. Cl. ...................................... 310/239; 310/71; 310/249

[58] Field of Search .................... 310/239, 71, 240, 88, 310/241, 242, 244, 245, 246, 247, 249

[56] References Cited

U.S. PATENT DOCUMENTS

| | | | |
|---|---|---|---|
| 1,457,896 | 6/1923 | Cook | 310/247 |
| 2,852,710 | 9/1958 | Foster | 310/246 |
| 2,857,540 | 10/1958 | Brennan | 310/249 |
| 3,159,763 | 12/1964 | Colvil | 310/239 |
| 3,579,007 | 5/1971 | Walter | 310/242 |
| 3,654,504 | 4/1972 | Susdorf | 310/246 |
| 4,404,487 | 9/1983 | Nimura | 310/239 |

FOREIGN PATENT DOCUMENTS

| | | | |
|---|---|---|---|
| 0097716 | 8/1979 | Japan | 310/247 |
| 2075276 | 11/1981 | United Kingdom | 310/242 |

*Primary Examiner*—R. Skudy
*Attorney, Agent, or Firm*—Oblon, Fisher, Spivak, McClelland & Maier

[57] ABSTRACT

A brush retaining device includes a brush, a conducting lead wire is connected to the brush and to a connecting terminal of the retaining device. A brush holder is provided with a cavity for the brush and the lead wire and a draw-out hole for lead wire. An insulating cover encloses the draw-out hole and provided with an elastically engaging part fittable to the brush holder and a groove in the insulating cover for permitting a passage of the lead wire through the insulating cover.

4 Claims, 6 Drawing Figures

FIGURE 1 PRIOR INVENTION
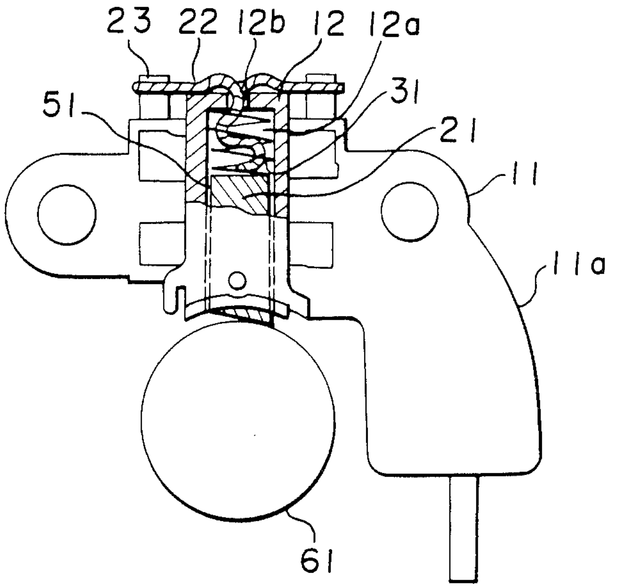
FIGURE 2 PRIOR INVENTION
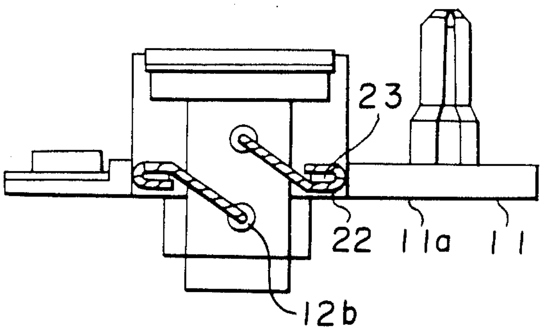

BRUSH-RETAINING DEVICE

BACKGROUND OF THE INVENTION

1. Field of the Invention

The present invention relates to a brush-retaining device for a generator, a motor and so on. More particularly, it relates to an improvement in a brush holder for receiving and holding brushes in a movable manner.

2. Description of Prior Art

Various types of brush-retaining device have been proposed for use in rotating machines such as generators and motors. A brush which is a structural element of the brush-retaining device is made in slide-contact with a slip ring rotated along with a rotor and is received in a brush holder in a movable manner.

FIGS. 1 and 2 show a conventional brush-retaining device. In FIGS. 1 and 2, a brush-retaining device 11 comprises a base plate **11*a* and a brush holder 12 fixed to the base plate 11*a*. The brush holder 12 is formed by molding a thermosetting resin, in which a cavity 12*a* for receiving a conducting brush 21 and a conducting lead wire 22 so that they are movable in the cavity 12*a*, and a draw-out hole 12*b* for drawing out the lead wire 12*b* are formed. The lead wire 22 has its one end connected to the brush 21 and the other end connected to a connecting terminal 23. For allowing movement of the brush 21 in the brush holder 12, there is a gap 51 between the inner wall of the brush holder 12 and the brush 21**.

In the conventional brush-retaining device having the construction as above-mentioned, the draw-out hole **12*b* for the lead wire 22 is left opened, with the consequence that foreign substance such as salt water, muddy water and so on are apt to enter into the brush holder 12. The salt water or the muddy water easily reaches the gap 51 between the holder 12 and the brush 21, and causes the inner wall of the brush holder 12 and the outer surface of the brush 21 to be rusted and fixed to each other. Consequently, the brush 21 ceases to slide within the brush holder 12. Further, since there is no measure to make the lead wire 22 immovable other than the brush which holds one end of the lead wire 22 and the connecting terminal 23** which holds the other end, the lead wire may be broken due to resonance vibration caused by an external force.

SUMMARY OF THE INVENTION

It is an object of the present invention to provide a brush-retaining device for preventing entrance of foregin substance such as salt water, muddy water and so on as well as breakage of a lead wire.

It is another object of the present invention to provide a brush-retaining device allowing easy assembly.

The foregoing and the other objects of the present invention have been attained by providing a brush-retaining device comprising having a conducting brush being in slide-contact with a rotating conduction part, a conducting lead wire having one end connected to the conducting brush and the other end connected to a connecting terminal, a brush holder provided with a cavity for receiving the brush and the lead wire in a movable manner and a draw-out hole for lead wire and an insualting cover for covering the entire region of the draw-out hole to prevent entrance of foreign substance. The lead wire, the insulating cover being provided with an elastically engaging part to be fitted to the draw-out hole for lead wire.

BRIEF DESCRIPTION OF THE DRAWINGS

FIG. 1 is a front view partly cross-sectioned of a conventional brush-retaining device;

FIG. 2 is a plan view of the brush-retaining device shown in FIG. 1;

DESCRIPTION OF THE PREFERRED EMBODIMENT

Figure 3:
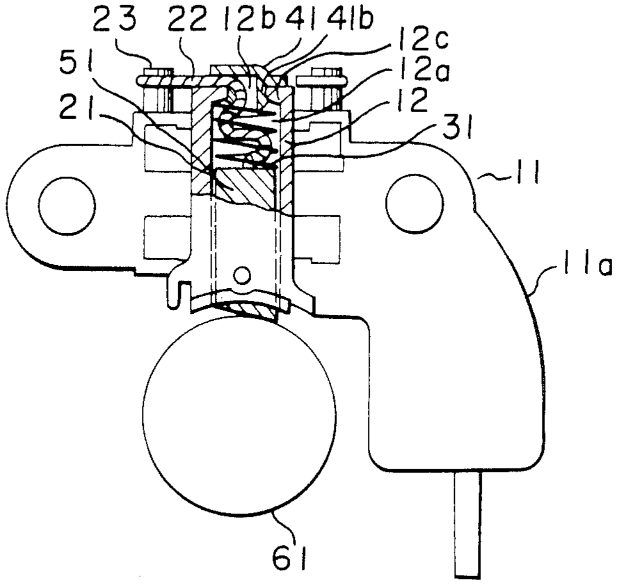
FIG. 3 is a front view partly cross-sectioned of an embodiment of the brush-retaining device of the present invention, the section through the insulating grooves being seen along cut III—III of FIG. 5.
Figure 4:
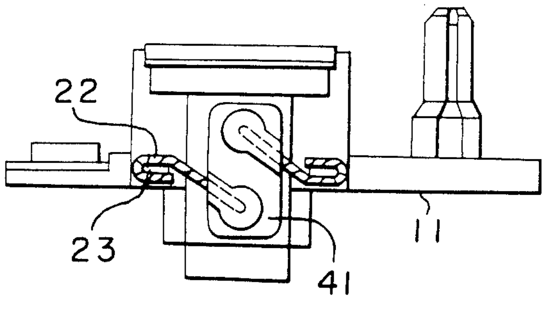
FIG. 4 is a plan view of the brush-retaining device shown in FIG. 3.
Figure 5:
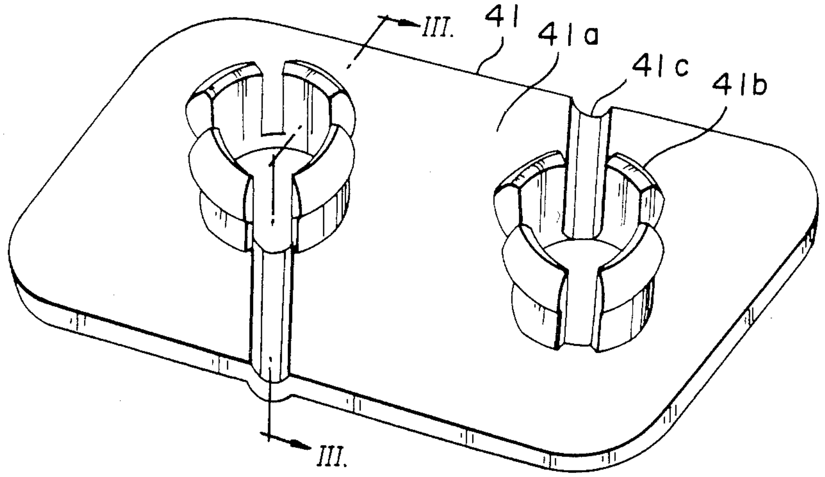
FIGS. 5 and 6 are respectively perspective views of embodiments of an insulating cover used for the brush-retaining device of the present invention.

An embodiment of the present invention will be described with reference to FIGS. 3–5. In FIGS. 3 and 4, a brush holder 12 made of synthetic resin is provided with a cavity **12*a* which receives a conducting brush 21 and a conducting lead wire 22 in a movable manner and a draw-out hole 12*b* for lead wire. An annular projection 12*c* is integrally formed in a circular inner wall of the draw-out hole 12*b*. A spring 31 extends in the cavity 12*a* to urge the brush 21 to a slip ring 61 which constitutes a rotating conduction part and the brush 21 is in slide-contact with it. The brush 21 is a sintered body of a mixture of copper and natural graphite. As shown in FIG. 5, an insulating cover 41 formed by molding a insulative resinous material such as Nylon 66 comprises a flat plate portion 41*a* which covers the entire region of the draw-out hole 12*b* and at least a part of lead wires 22 and two elastically engaging parts 41*b* of a generally cylindrical shape which are formed integrally with the flat plate portion 41*a* and are respectively engaged with the annular projections 12*c* formed in the inner walls of the draw-out holes 12*b*. Each of the elastically engaging parts 41*b* is provided with four vertical slits which are respectively formed by dividing a circle at a given interval so that the elastically engaging part 41*b* can be easily bent inwardly. Grooves 41*c* are formed in the flat plate portion 41*a* to let the lead wire 22 to pass from the engaging part 41*b*. As shown in FIG. 5, the brush-retaining device of the present invention may be provided with two elastically engaging parts 41*b*, each having a groove 41*c***.

In this embodiment, a brush 21 and a lead wire 22 connected to the brush 21 at its one end are put in the brush holder 12 from an opening at the side of the slip ring 61. Then, the other end of the lead wire 22 is drawn-out from the draw-out hole **12*b* to connect to the connecting terminal 23 and thereafter, the engaging part 41*b* of the insulating cover 41 is engaged with the annular projection 12*c* while the lead wire 22 is led into the groove 41*c* formed in the cover 41, whereby the cover 41 is secured to the brush holder 12. Thus, the draw-out hole 12*b* is completely covered by the insulating cover 41 to prevent entrance of salt water or muddy water into the brush holder 12 from the outside. Accordingly, there takes place no rust on the inner wall of the brush holder and the outer surface of the brush 21, hence difficulty in sliding movement of the brush 21 is eliminated. Further, the lead wire 22 is immovably held in the groove 41*c* in association with the lower surface of the insulating cover 41 and the upper surface of the brush holder 12. As a result, there is no risk of resonance vibration due to an external force, and the lead wire 22** is prevented from breaking.

In this embodiment, the insulating cover can be easily fitted to the brush holder 12 because the engaging part 41*b* is divided into four parts which are arranged at a given interval in a circle and each of the divided parts of the engaging part 41*b* is easily bent inwardly.

Figure 6:
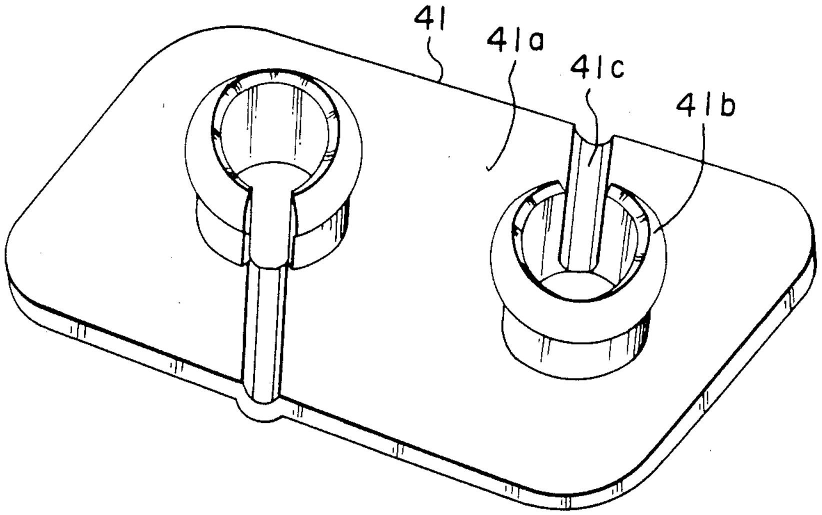

In the embodiment, the engaging part 41*b* is divided into four parts. However, it is possible to divide it into more than or less than four. Further, it is possible to form the elastically engaging part 41*b* to have an annular form without dividing it and a part of the annular part may be cut, as shown in FIG. 6, so as to pass a lead wire 22 not shown in FIG. 6. Obviously, numerous modifications and variations of the present invention are possible in light of the above teachings. It is therefore to be understood that within the scope of the appended claims, the invention may be practiced otherwise than as specifically described herein.

What is claimed is:

1. A brush-retaining device which comprises:

a conducting brush in slide-contact with a rotating conduction part, a conducting lead wire having one end connected to said conducting brush and the other end connected to a connecting terminal of the brush retaining device, a brush holder provided with a cavity for receiving said brush and said lead wire in a movable manner and with a draw-out hole for lead wire, and an insulating cover for covering the entirety of said draw-out hole and at least a part of said lead wire, said insulating cover being provided with an elastically engaging part fittable to said brush holder means for permitting a passage of said lead wire through said insulating wire through said insulating cover.

2. The brush-retaining device according to claim 1, wherein said means for permitting said passage of said lead wire comprises a groove formed in said insulating cover.

3. The brush-retaining device according to claim 1, wherein said brush holder is provided with an inwardly extending projection at said draw-out hole for engagement with said elastically engaging part of said insulating cover.

4. The brush-retaining device according to claim 3, wherein said elastically engaging part of said cover is radially split into plural portions.

* * * * *